(12) United States Patent
Burek et al.

(10) Patent No.: US 9,429,729 B2
(45) Date of Patent: Aug. 30, 2016

(54) COMPACT STORAGE AND DISTRIBUTION MODULE FOR OPTICAL FIBER AND CABLE

(71) Applicant: OFS Fitel, LLC, Norcross, GA (US)

(72) Inventors: Denis E Burek, Cumming, GA (US);
John E George, Cumming, GA (US);
Willard C White, Suwanee, GA (US);
Edward V Charbonneau, Snellville, GA (US)

(73) Assignee: OFS FITEL, LLC, Norcross, GA (US)

( * ) Notice: Subject to any disclaimer, the term of this patent is extended or adjusted under 35 U.S.C. 154(b) by 211 days.

(21) Appl. No.: 14/450,833

(22) Filed: Aug. 4, 2014

(65) Prior Publication Data

US 2016/0033733 A1  Feb. 4, 2016

(51) Int. Cl.
*G02B 6/44* (2006.01)
(52) U.S. Cl.
CPC .................................. *G02B 6/4457* (2013.01)
(58) Field of Classification Search
CPC .................................................... G02B 6/4457
See application file for complete search history.

(56) References Cited

U.S. PATENT DOCUMENTS

| | | | | |
|---|---|---|---|---|
| 5,947,765 A * | 9/1999 | Carlson, Jr. | ......... | G02B 6/3897 439/491 |
| 6,243,526 B1 * | 6/2001 | Garibay | ............... | G02B 6/3887 385/135 |
| 7,346,253 B2 * | 3/2008 | Bloodworth | ......... | G02B 6/4453 385/134 |
| 7,477,829 B2 * | 1/2009 | Kaplan | ................ | G02B 6/4441 385/134 |
| 8,189,984 B2 * | 5/2012 | Kowalczyk | .......... | G02B 6/4441 385/135 |
| 9,188,760 B2 * | 11/2015 | Kowalczyk | .......... | G02B 6/4457 |
| 9,261,663 B2 * | 2/2016 | Loeffelholz | .......... | G02B 6/4453 |
| 9,291,788 B2 * | 3/2016 | Rudenick | ............. | G02B 6/4454 |
| 2009/0074370 A1 * | 3/2009 | Kowalczyk | .......... | G02B 6/4441 385/135 |
| 2012/0020635 A1 * | 1/2012 | Hendrickson | ........ | B65H 49/205 385/135 |
| 2012/0138214 A1 * | 6/2012 | Burek | .................. | G02B 6/4463 156/166 |
| 2012/0294580 A1 * | 11/2012 | Burek | .................. | G02B 6/4463 385/135 |

\* cited by examiner

*Primary Examiner* — Daniel Petkovsek
(74) *Attorney, Agent, or Firm* — Leo Zucker, Esq.

(57) ABSTRACT

A storage and distribution module for optical fiber and cable includes a base having a bottom wall, and the bottom wall has a raised boss. A number of spool mounting fingers are arranged and configured on top of the boss to retain a fiber supply spool containing slack windings of an optical fiber. The bottom wall of the base, the boss, and an end face of the spool when retained on the mounting fingers, define a storage region underneath the spool for storing a slack length of a provider cable. A bracket is fixed inside the base, and the bracket is formed to support a connector adapter for connecting a first connector that terminates the slack fiber windings contained on the supply spool when retained on the mounting fingers, with a second connector that terminates the slack length of provider cable stored in the region under the spool.

11 Claims, 6 Drawing Sheets

COMPACT STORAGE AND DISTRIBUTION MODULE FOR OPTICAL FIBER AND CABLE

BACKGROUND OF THE INVENTION

1. Field of the Invention

The present invention relates to storage and distribution modules or boxes for communication lines, particularly optical fibers and cables.

2. Discussion of the Known Art

Patent Application Pub. No. US 2012/0138214 (Jun. 7, 2012) and Pub. No. US 2012/0294580 (Nov. 22, 2012) both disclose an optical fiber storage module in which a fiber supply spool is mounted for storage with unwound (i.e., slack) fiber on the spool, after a length of fiber is unwound from the spool for installation at a customer's premises. A connector adapter is mounted inside the module to allow an end of the slack fiber on the spool to connect to a relatively short jumper cable that leads to an optical network terminal (ONT) located near the module inside the premises. The two published applications are owned by the assignee of the present application and are incorporated by reference. See Pub. No. US 2012/0020635 (Jan. 26, 2012) also owned by the present assignee and incorporated by reference, and Pub. No. US 2009/0074370 (Mar. 19, 2009) disclosing a fiber optic enclosure which contains a cable spool that engages a bearing mount for rotation inside the enclosure.

The optical network terminal or ONT is typically located close to a television set top box and/or modem that are served by way of a network provider cable that enters a customer's premises from outside. The point where the provider's cable enters the premises (e.g., through a wall above a front doorway) is usually distant from the location of the ONT inside the premises (e.g., a bedroom or living room), however. Thus, it would be desirable to provide a cable and fiber storage and distribution module that can be mounted unobtrusively inside the premises near the cable entry point, and which can also (i) store an excess or slack length of the entering provider cable, (ii) store a fiber supply spool containing slack windings of fiber after a leading length of the fiber is unwound for routing between the ONT and the module at the premises, and (iii) facilitate a connection between the slack provider cable and the slack fiber stored inside the module.

SUMMARY OF THE INVENTION

According to the invention, a storage and distribution module for optical fiber and cable includes a base having a bottom wall and a side wall, and a boss on the bottom wall of the base has a generally cylindrical wall such that a top of the boss is a certain height above the bottom wall of the base. A number of spool mounting fingers are formed to extend upward from the top of the boss, to retain a fiber supply spool that contains an unwound or slack length of an optical fiber when a first end face of the spool is centered over and urged onto the mounting fingers. The bottom wall of the base, the wall of the boss, and the first end face of the spool when retained on the mounting fingers, together define a storage region underneath the spool for storing a slack length of optical cable.

An adapter bracket fixed inside the base is constructed and arranged to support a connector adapter configured to connect a first connector that terminates an end of slack fiber contained on the supply spool when the spool is retained on the mounting fingers, with a second connector that terminates an end of slack cable when stored in the storage region underneath the spool.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
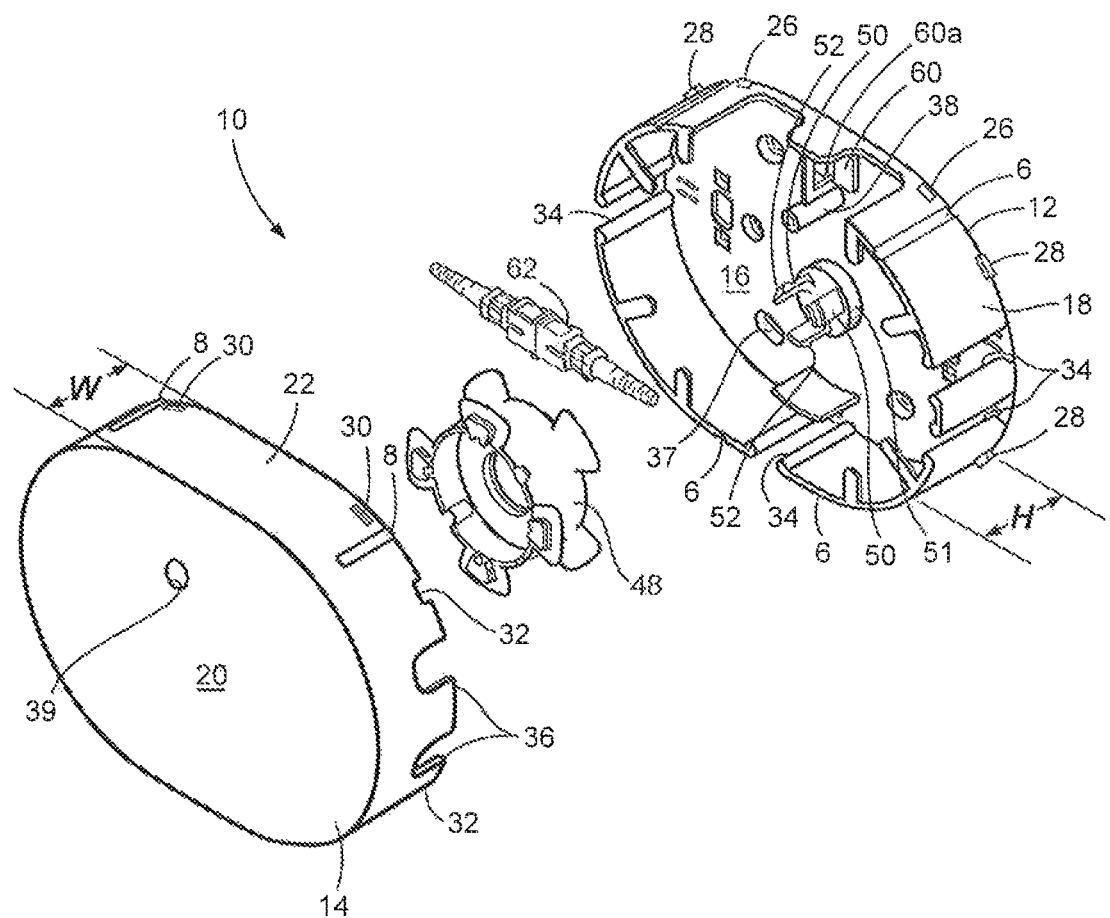
FIG. 1 is an exploded view showing parts of an optical fiber storage and distribution module according to the invention.

FIG. 1 is an exploded view of an optical fiber storage and distribution module 10 according to the invention. The module includes a base 12 and a base cover 14 both of which can be formed, for example, from a polypropylene impact copolymer or equivalent material that meets all applicable codes concerning home or office communications equipment. In the illustrated embodiment, the module base 12 and the cover 14 are discorectangular or stadium in shape to provide the module 10 with a compact and aesthetically pleasing appearance. It will be understood, however, that the shape and the dimensions of the module 10 may be modified as needed to suit particular installation requirements.

In the embodiment of FIG. 1, the module base 12 has a bottom wall 16, and a side wall 18 that extends a certain height H, e.g., about 0.750 in. (19.05 mm) from the bottom wall 16. The cover 14 has a top wall 20, and a side wall 22 that extends a certain length W, e.g., about 1.090 in. (27.69 mm) from the top wall 20. The base 12 and the cover 14 are configured and dimensioned so that when the cover confronts the base as shown, the side wall 22 of the cover can slide over the side wall 18 of the base 12, and the cover 14 can assume a closed position at which the interior of the base is protectively enclosed the cover.

Figure 2:
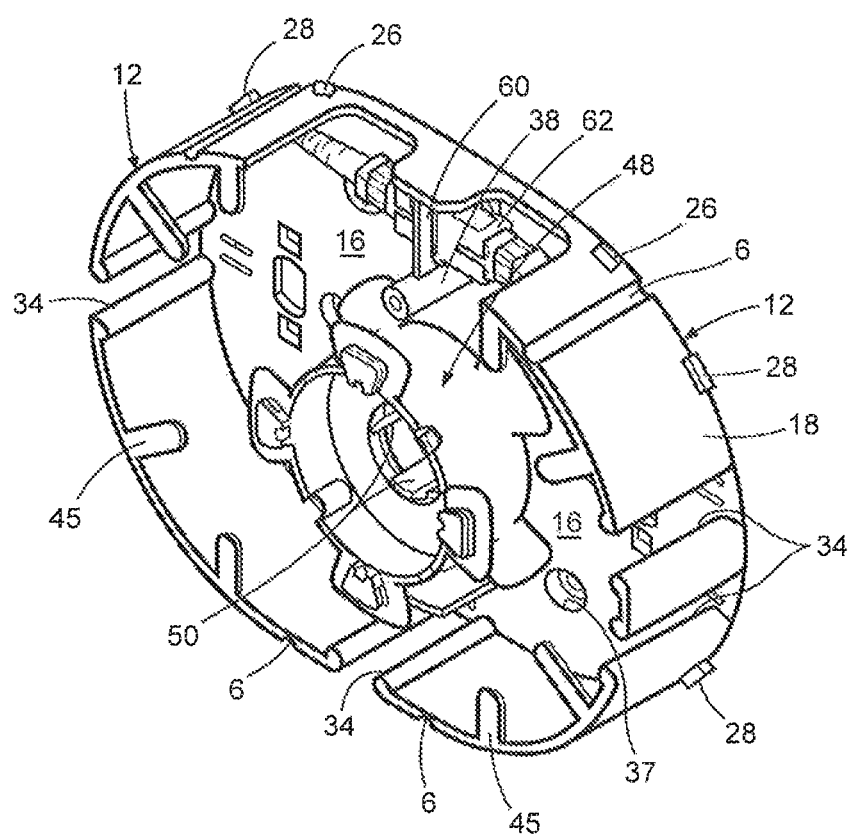
FIG. 2 is an isometric view of a base of the inventive module showing parts mounted inside the base.

As seen in FIGS. 1 and 2, the side wall 18 of the base 12 has wedge shaped protuberances 26 formed on the outside surface of the wall 18 near the bottom wall 16 of the base. The side wall 22 of the cover has corresponding slots 30 (FIG. 1) located so that the protuberances 26 snap into the cover slots 30 to retain the cover 14 in the closed position. The outside surface of the base side wall 18 also has a number of projecting screwdriver lift tabs 28 formed near the bottom wall 16 of the base. When the cover 14 is at the closed position, the tabs 28 are received in correspondingly located openings 32 formed along the leading edge of the cover side wall 22.

The side wall 18 of the base also has a number of through openings 34 at certain locations about the wall. The openings 34 are formed with rounded edges, and are located so that in most typical installations a given cable or fiber can be routed through at least one of the openings 34 without critical bending, viz., without bending to less than a specified minimum bend radius for the cable or fiber. The side wall 22 of the cover has corresponding cutouts 36 which, as seen in FIG. 1, are located on the wall 22 to coincide with the through openings 34 in the base side wall 18 when the cover is placed at the enclosed position with the orientation in FIG. 1.

Note that the locations of the through openings 34 in the base side wall 18, and the locations of the cutouts 36 in the cover side wall 22, are such that if the cover 14 is inverted or turned 180 degrees from the orientation in FIG. 1, the cutouts 36 in the cover side wall 22 no longer match the locations of the through openings 34 in the base side wall 18. Therefore, to ensure the cover 14 is properly oriented before enclosing the base 12, the base side wall 18 has a number of rounded vertical indentations 6 formed in the outside surface of the wall 18. The positions of the indentations 6 are keyed to correspond to the positions of rounded vertical protrusions 8 formed on the inside surface of the cover side wall 22, so that the cover protrusions 8 are received to slide in the base indentations 6 only when the cover 14 is oriented as in FIG. 1. Otherwise, the cover protrusions 8 will not match the positions of the base indentations 6, and the cover 14 can not advance to a closed position with respect to the base 12.

Figure 4:
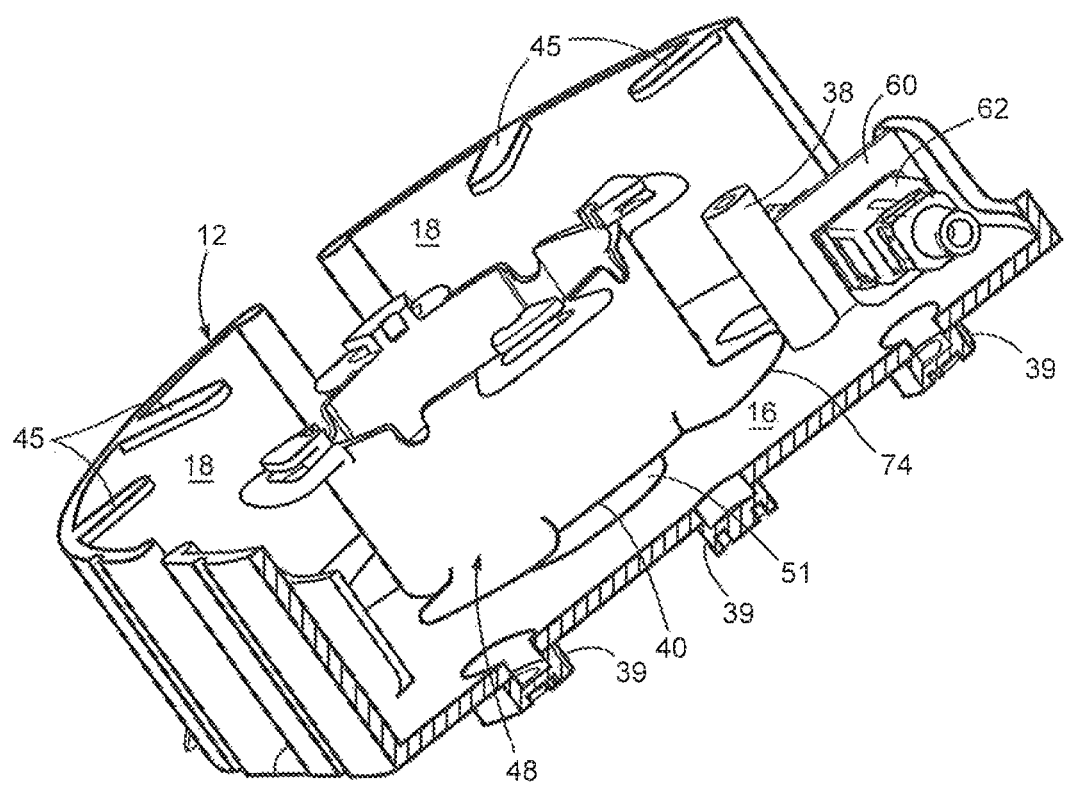
FIG. 4 is an isometric view of a portion of the base as seen from line 4-4 in FIG. 3.
Figure 5:
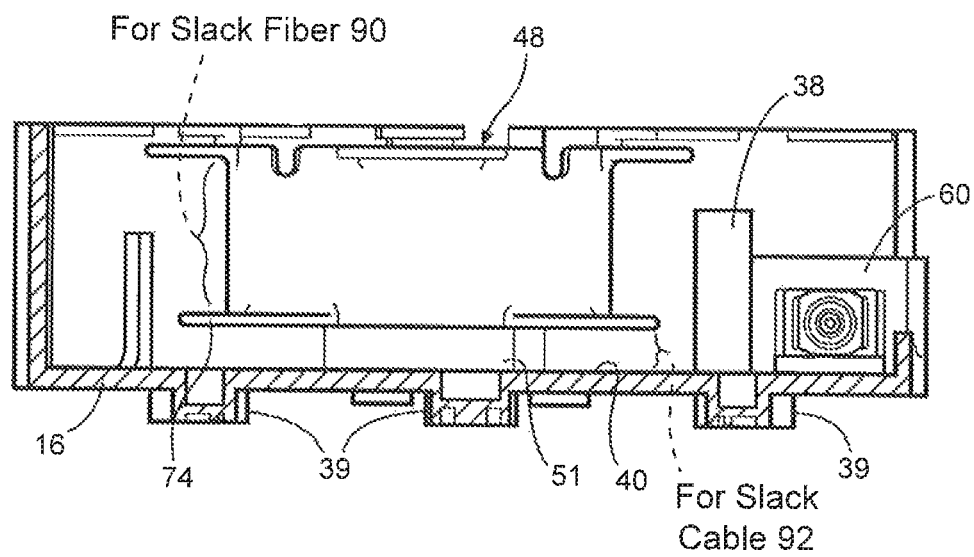
FIG. 5 is a view of the base in FIG. 4 in side elevation.

For mounting the module base 12 on a wall or other suitable surface near a cable entry location inside a customer premises, the bottom wall 16 of the base 12 has a number of mounting holes or elongated slots 37 for passage of screws or other mounting fasteners. Two or more feet 39 protrude from the outside surface of the bottom wall 16 as shown in FIGS. 4 and 5, so that the bottom wall 16 and the leading edge of the side wall 22 of the cover 14 are clear of the mounting surface when the cover is at the enclosed position on the base. The module base 12 is also formed with a post 38 extending vertically from the bottom wall 16 of the base. The post 38 has an axial passage, and is located to receive a self-tapping screw or other fastener when inserted through an opening 39 (FIG. 1) in the top wall 20 of the cover 14, for locking the cover at the enclosed position on the base.

The bottom wall 16 of the base is also formed with a cylindrical boss 51 that extends vertically and centrally of the base to a height of, e.g., approximately ¼ inch. Three spool mounting fingers 50 are formed and arranged to extend upward from the top of the boss 51. The fingers 50 are equally circumferentially spaced from one another, and extend to an overall height of, e.g., one-half inch above the above the base bottom wall 16. See FIGS. 1, 4, and 5. The fingers 50 are dimensioned to engage and retain a fiber supply spool 48 when the spool is centered above and urged over the fingers 50. Details of the fiber supply spool 48 are described with respect to FIG. 6.

Figure 6:
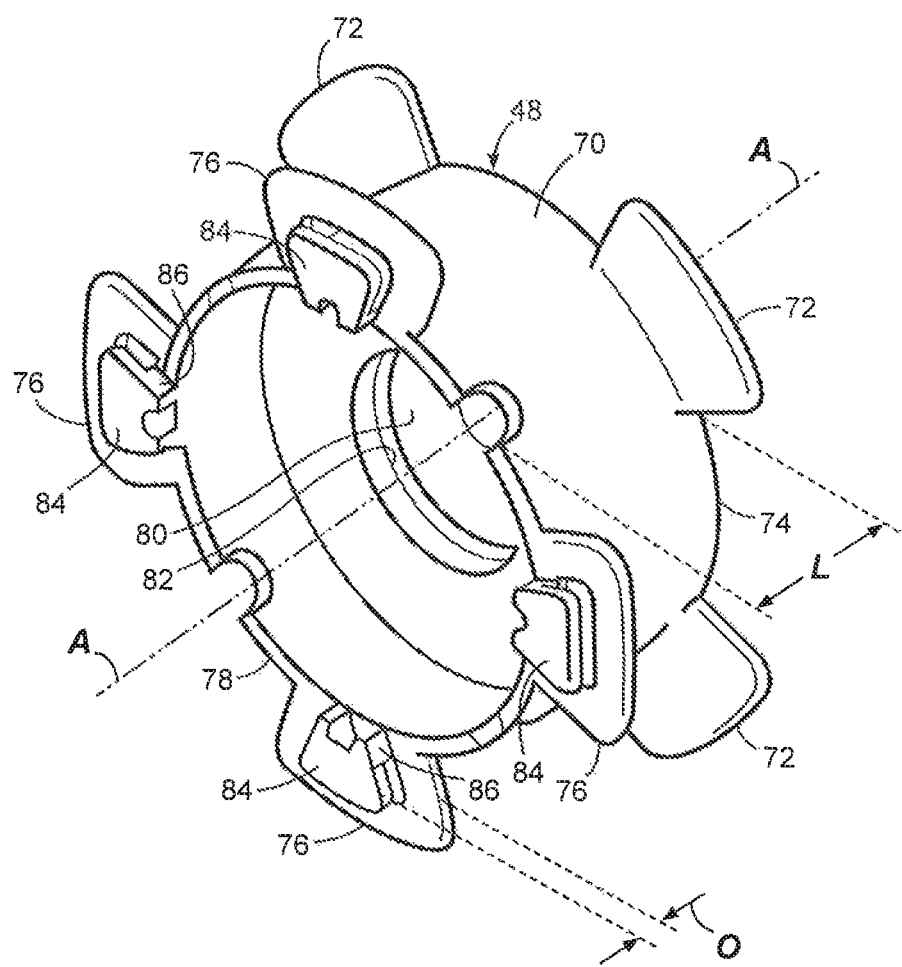
FIG. 6 is an isometric view of a fiber supply spool shown in FIGS. 1 to 5.

In FIG. 6, the fiber supply spool 48 includes a cylindrical wall or hub 70 having an axial length L of, e.g., approximately 0.870 inches. A first set of, e.g., four equally circumferentially spaced retaining flanges 72 (three of which are visible in FIG. 6) extend radially outward from the spool hub 70 at a first axial end face 74 of the hub, as seen at the right in FIG. 6. A second set of equally circumferentially spaced flanges 76 extend radially outward from the hub 70 at a second axial end face 78 of the hub, opposite the first set of flanges 72 at the first end face 74. The first and the second sets of retaining flanges 72, 76, and the spool hub 70, combine to form a first winding section of the supply spool 48.

Accordingly, a number of turns of a fiber can be pre-wound over the hub 70 in the first winding section of the spool 48, between the opposed sets of retaining flanges 72, 76. A leading end of the fiber may also be provided with an optical connecter for engaging a mating connector on the ONT at the customer premises, after the leading end is unwound from the first winding section of the spool 48 and installed over a path between the ONT and the mounted module 10.

The spool hub 70 has a reduced or narrowed inside diameter portion 80 extending in an axial direction A from the first end face 74 of the spool 48 for about half the overall axial length L of the spool. An annular groove 82 in the inner circumference of the hub portion 80 engages and seats catches 52 (see FIG. 1) at the free ends of the mounting fingers 50. When the first end face 74 of the spool 48 is centered over the fingers 50 and urged toward them, the fingers enter the hub portion 80 and deflect inward until the catches 52 are seated in the groove 82. Thus, the fiber supply spool 48 can be stored inside the module base 12 with unwound or slack fiber contained in the first winding section of the spool.

A third set of retaining flanges 84 are formed next to the second end face 78 of the spool hub 70, at four equally circumferentially spaced positions that coincide with the angular positions of the second set of flanges 76, as shown in FIG. 6. Each flange 74 of the third set is joined to the hub end face 78 by a base lip 86, so that the flange 74 is offset axially by a spacing 0 from the opposed flange 76 of the second set, and the flange 74 extends radially outward from the hub 70 and parallel to the opposed flange 76. The second and the third sets of retaining flanges 76, 74, and the base lips 86 of the flanges 74, combine to form a second winding section of the supply spool 48.

As mentioned, the length of a fiber 90 (see FIG. 3) initially wound in the first winding section of the supply spool 48 should be at least enough to install or route the fiber inside the customer premises over a path between the location of the ONT, and the location of the module 10 when mounted near the entry point of a service provider cable 92. The slack length of the fiber 90 contained in the second winding section of the spool 48 need only be enough to allow a connector 94 provided at the end of the fiber 90 to engage a connector adapter 62 supported inside the module 10, as described later below.

As shown in FIGS. 4 and 5, when the fiber supply spool 48 is mounted on the fingers 50 atop the raised boss 51, the first end face 74 of the spool 48, the cylindrical wall of the boss 51, and the bottom wall 16 of the module base 12, together define bounds of a storage region 40 underneath the spool 48 wherein a slack length, e.g., ten or more feet of the provider cable 92 can be coiled and stored. A number of guide fingers 45 project inwardly from the top edge of the base side wall 18 to help dress or guide the provider cable 92 between a through opening 34 in the base side wall 18 and the storage region 40 under the spool 48.

Figure 3:
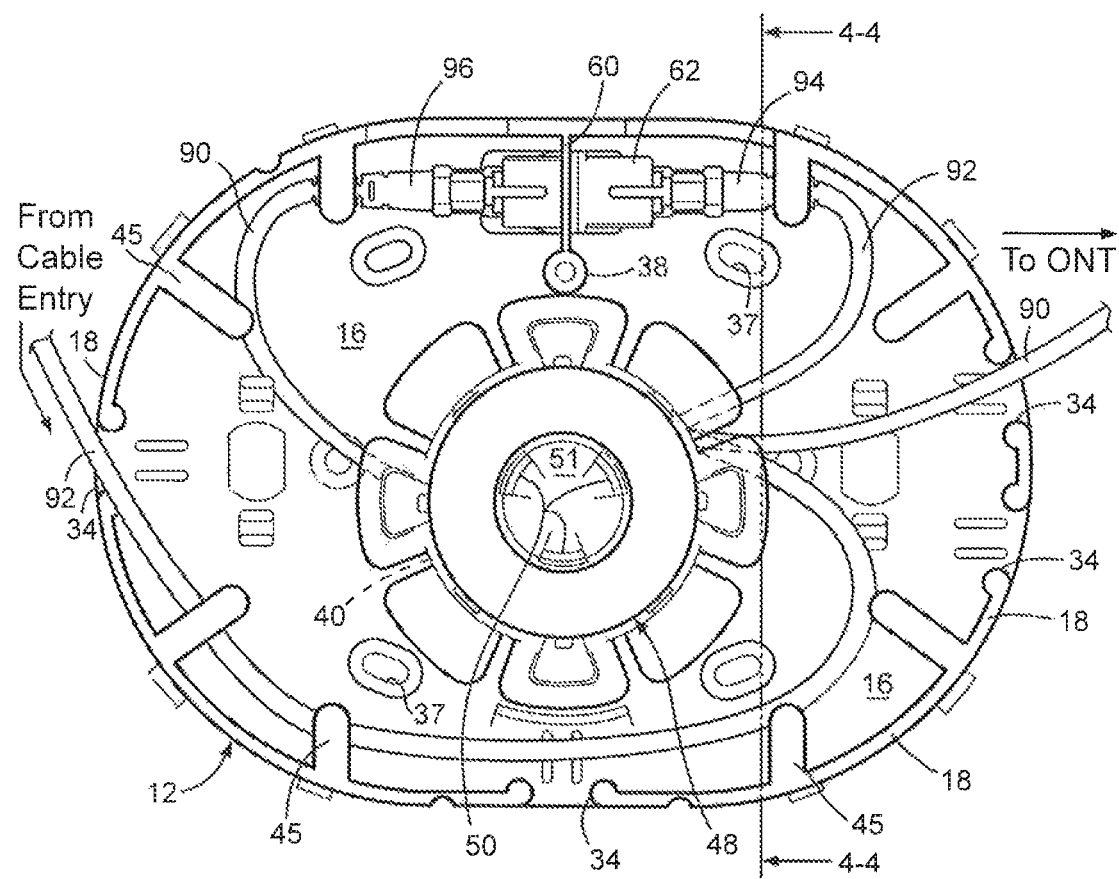
FIG. 3 is a plan view of the base in FIG. 2.

A connector adapter bracket 60 is fixed inside the module base 12 between the base side wall 18 and the cover screw post 38, as seen in FIGS. 1 to 5. The bracket 60 is formed to accept and to retain a conventional connector adapter 62 which, for example, will snap into place when urged through an opening 60a (FIG. 1) in the bracket. As illustrated in FIG. 3, the adapter 62 is configured to connect on one side to a connector 94 that terminates the end of the slack provider cable 92 contained in the module storage region 40, and to connect on the other side with a connector 96 that terminates the end of the slack fiber 90 wound on the supply spool 48. It will be understood that when the end of the slack cable contained in the storage region 40 and the end of the slack fiber wound on the spool 48 are both connected to the adapter 62 in the module 10, and the leading end of the fiber supplied from the spool 48 is connected to the ONT at the premises, the provider cable 92 and the ONT are operatively connected with one another over the entire length of the fiber 90.

As disclosed herein, the inventive module 10 provides (1) an enclosure in which a fiber supply spool is mounted for storage with remaining or slack windings of a fiber that is unwound from the spool for routing to an ONT or other equipment at a customer premises, (2) a cable storage region under the mounted spool in which a slack length of a provider cable that enters the premises is stored, and (3) a bracket or support for a connector adapter to connect the ends of the slack fiber and the slack cable to one another inside the module. The module 10 is compact in size, and has an aesthetically pleasing appearance if not completely hidden from view after mounting at the premises.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A storage and distribution module for optical fiber and cable, comprising:
   a base including a bottom wall and a first side wall;
   the bottom wall of the base includes a boss having a generally cylindrical wall, and a top of the boss is disposed a certain height above the bottom wall of the base;
   a number of spool mounting fingers configured to extend from the top of the boss, for retaining a fiber supply spool containing slack windings of an optical fiber when a first end face of the spool is centered over and urged onto the mounting fingers;
   wherein the bottom wall of the base, the cylindrical wall of the boss, and the first end face of the spool when retained on the mounting fingers, together define a storage region underneath the spool for storing a slack length of a provider cable; and
   an adapter bracket fixed inside the base, wherein the bracket is constructed and arranged to support a connector adapter configured to connect a first connector that terminates the slack windings of a fiber contained on the supply spool when the spool is retained on the mounting fingers, with a second connector that terminates the slack length of a provider cable when the cable is stored in the storage region underneath the supply spool.

2. The storage and distribution module of claim 1, comprising a cover including a top wall and a second side wall for enclosing the base.

3. A storage and distribution module according to claim 2, wherein the base and the cover are discorectangular or stadium in overall shape.

4. A storage and distribution module according to claim 2, wherein the first side wall of the base has a number of through openings at certain locations about the wall so that a given cable or fiber can be routed through at least one of the openings without critical bending in a given installation, and the second side wall of the cover has corresponding cutouts located to coincide with the through openings in first side wall of the base when the cover is at a closed position with respect to the base.

5. A storage and distribution module according to claim 4, including a number of retaining fingers extending inwardly from the first side wall of the base, for guiding or dressing a length of the provider cable between one of the through openings in the first side wall of the base and the storage region beneath the spool.

6. A storage and distribution module according to claim 4, wherein the base and the cover are formed and configured so that the cutouts in the second side wall of the cover when in the closed position on the base, coincide with the through openings in the first side wall of the base, only when the cover is at a certain orientation with respect to the base.

7. A storage and distribution module according to claim 6, wherein the base and the cover are formed and configured so that the cover is blocked from the closed position on the base when the cover lacks the certain orientation.

8. The storage and distribution module of claim 1, including a connector adapter formed and dimensioned to be retained by the adapter bracket fixed in the base of the module.

9. The storage and distribution module of claim 1, including a fiber supply spool constructed and arranged to be retained by the mounting fingers atop the boss on the bottom wall of the base.

10. The storage and distribution module of claim 1, wherein the top of the boss is disposed approximately ¼ in. above the bottom wall of the base.

11. The storage and distribution module of claim 1, wherein the storage region beneath the spool is dimensioned to accommodate a slack provider cable of approximately ten or more feet in length.

* * * * *